United States Patent

[11] 3,617,705

| [72] | Inventors | Hironobu Takano;<br>Hiroshi Tsutsui; Masuo Kifune; Katsuhiko Miyoshi, all of Kawasaki-shi, Japan |
|---|---|---|
| [21] | Appl. No. | 810,240 |
| [22] | Filed | Mar. 25, 1969 |
| [45] | Patented | Nov. 2, 1971 |
| [73] | Assignee | Tokyo Shibaura Denki Kabushiki Kaisha Kanagawa-ken, Japan |
| [32] | Priorities | Mar. 27, 1968, Mar. 27, 1968, Mar. 27, 1968 |
| [33] | | Japan |
| [31] | | 43/23498; 43/19454, 43/23499 |

[54] METHOD OF MEASURING STRESS WITH X-RAYS
2 Claims, 5 Drawing Figs.

[52] U.S. Cl. ........................................................ 250/51.5
[51] Int. Cl. ................................................... G01n 23/20
[50] Field of Search ........................................... 250/51.5

[56] References Cited
UNITED STATES PATENTS
2,462,374  2/1949  Firth ............................ 250/51.5 X
2,898,470  8/1959  Khol ............................ 250/51.5
2,945,300  7/1960  Khol et al. .................... 250/51.5 X
3,030,507  4/1962  Khol ............................ 250/51.5

*Primary Examiner*—William F. Lindquist
*Attorneys*—Robert E. Burns and Emmanuel J. Lobato ABSTRACT: In the $\sin^2\Psi$ method of X-ray stress measurement, an X-ray beam is projected upon the surface of a material at varying incident angles $\alpha$, a group of spectral distribution curves for respective incident angles are plotted on rectangular coordinates with the abscissa representing the diffraction angle $2\theta$ of the X-ray beam while the ordinate counts, per second (cps), represents the intensity of the diffracted X-ray beam and the value of $\sin^2\Psi$, peak values $(a, b, c, d)$ of the counts per second of respective distribution curves are determined, values $(a', b', c', d')$ of $\sin^2\Psi$ for respective peak values are calculated, a straight line $(a'\ b'\ c'\ d')$ is drawn by connecting said calculated values of $\sin^2\Psi$, and the slope $$\frac{\partial 2\theta\Psi}{\partial \sin^2\Psi}$$

of the straight line is measured by means of a special rule.

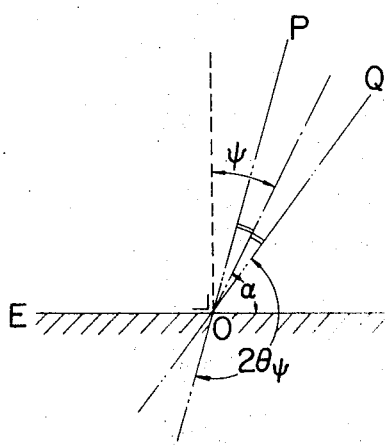
FIG. 1
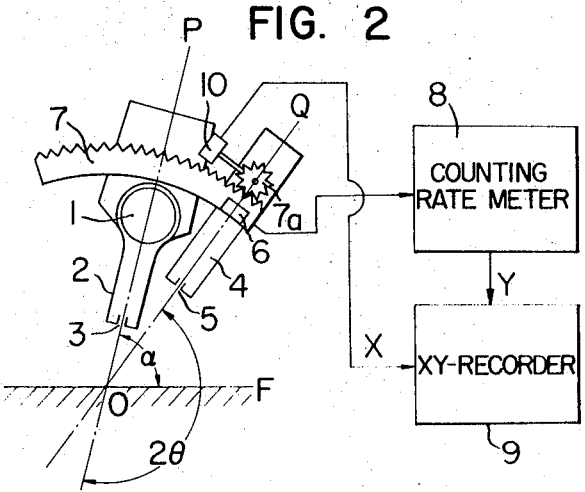
FIG. 2
FIG. 4
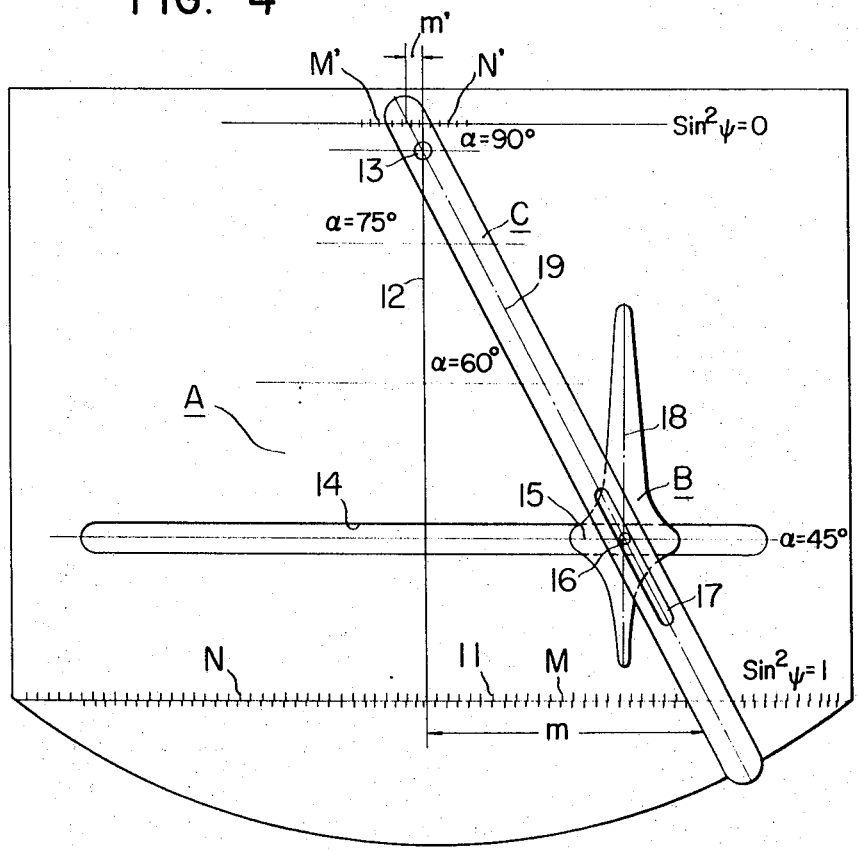

METHOD OF MEASURING STRESS WITH X-RAYS

BACKGROUND OF THE INVENTION

This invention relates to a method of measuring stress with X-rays, and to scales utilized for that purpose, and, more particularly, to a method of measuring residual stress remaining in structural members of steel or castings by irradiating such members with a beam of X-rays and by measuring the spectrum distribution of diffracted X-rays.

As a method of X-ray stress measurement, a so-called $sin^2\Psi$ method has been proposed wherein the stress of a sample is determined by knowing the manner of varying the maximum diffraction angle $2\theta\Psi$ of the scattered rays where the incident angle $\alpha$ of an X-ray beam is varied.

Usually, the spectral distribution of the diffracted rays is recorded in terms of the relation between a time scale representing the diffraction angle and the counts per second (cps) of the diffracted X-rays, and from this record the maximum diffraction angle $2\theta\Psi$ is determined either by the half-value breadth method, the parabola-fitting method, or the Fourier analysis method.

However, none of these methods permit an instantaneous determination of the stress value, and each relies upon complicated data processings and calculations. Especially, said method of determining the maximum diffraction angle $2\theta\Psi$ requires relatively complicated operations and cannot provide sufficiently high reliability. Thus, the result is susceptible to errors caused by statistical variations, variations in the source of electric supply, the crystal structure of the sample, and abnormal phenomena of the measuring device. In addition, in order to accurately determine the position of maximum diffraction, measurements must be made over a sufficiently wide range of angle $2\theta$, so that it is necessary to determine the spectral distribution over such wide range wherein the diffracted X-rays cannot be discriminated from the background noise, thus requiring much time for measuring and for data processing. Further, it is required to use many sheets of recording papers, section papers and the like.

SUMMARY OF THE INVENTION

It is therefore an object of this invention to provide a novel method of graphically determining stress with X-rays.

Another object of this invention is to provide an X-ray method of readily and accurately determining stress remaining in materials without relying upon complicated data processings and calculations.

Yet another object of this invention is to provide a novel rule suitable for use in carrying out the novel method.

Briefly, the method of measuring stress embodying this invention comprises the steps of projecting an X-ray beam upon the surface of a material at varying incident angles ($\alpha$); plotting a group of spectral distribution curves for respective incident angles on rectangular coordinates, with the abscissa representing the diffraction angle ($2\theta$) of said X-ray beam, while the ordinate counts per second (cps) represents the intensity of the diffracted X-ray beam and the value of $sin^2\Psi$, where $\Psi$ represents the angle between a line normal to the surface of the material and a bisector of an angle subtended by the incident X-ray beam (PO) and the direction of the maximum diffraction (OQ); determining peak values ($a, b, c, d$) of counts per second of respective distribution curves; calculating values ($a', b', c', d'$) of $sin^2\Psi$ for respective peak values; drawing a straight line ($a'b'c'd'$) connecting said calculated values of $sin^2\Psi$; and determining the slope $$\left(\frac{\partial 2\theta\Psi}{\partial \sin^2 \Psi}\right)$$

of said straight line.

The spectral distribution curves are plotted by an XY recorder responsive to an electric signal representing the intensity of the diffracted X-rays, and to an electric signal representing the angle of said direction of diffraction.

In accordance with another aspect of this invention there is provided a novel rule for measuring said slope. In one form, the rule comprises a first scale including an ordinate graduated with $sin^2\Psi$, two abscissas crossing the ordinate at points corresponding to $sin^2\Psi=1$ and $sin^2\Psi=0$, respectively, the abscissas being graduated with stress values, and a guide groove parallel to the abscissas; a second scale slidably received in the guide groove; and a third scale, one end of the third scale being pivotally connected to the first scale at a point on the ordinate thereof corresponding to the value of $sin^2\Psi$ at an incident angle $\alpha=90°$ and in the absence of any stress, and the opposite end being connected to the second scale through a pin and slot connection.

To use the rule, the graduation $sin^2\Psi=1$ on the first scale is aligned with the graduation $sin^2\Psi=1$ on the ordinate of the rectangular coordinates for said groups of spectral distribution curves; the ordinate of the first scale is aligned with a line corresponding to the maximum diffraction angle $2\theta\Psi$, of a spectral distribution curve for an incident angle $\alpha=90°$, the centerline of the third scale is aligned with the straight line ($a'b'c'd'$); and stress values are determined from crossing points between the center line of the third scale and abscissas of the first scale corresponding to $sin^2\Psi=1$ and $sin^2\Psi=0$, respectively.

In a modified form, the rule comprises a first scale having a straight side edge which corresponds to the ordinate of rectangular coordinates and graduated with the value of $sin^2\Psi$, a line graduated with stress, said line crossing the straight side edge at a point corresponding to $sin^2\Psi=0$, and a guide groove extending at right angles to the straight side edge, one side edge of the guide groove crossing the straight side edge at a point corresponding to $sin^2\Psi=1$; a second scale slidably received in the guide groove, one side edge of the second scale cooperating with said one side edge of the guide groove being graduated with stress; and a third scale, one end thereof being pivotally connected to the first scale at a point on the straight side edge corresponding to the value of $sin^2\Psi$ at an incident angle $\alpha=90°$ in the absence of any stress, and the other end of the third scale being connected to the second scale through a pin and slot connection.

BRIEF DESCRIPTION OF THE DRAWING

In the accompanying drawings:

FIG. 1 is a graph to explain the principle of X-ray stress measurements by the $sin^2\Psi$ method;

FIG. 2 is a schematic representation, partly in block diagram, of apparatus utilized to carry out this invention;

FIG. 4 is a plan view of a rule utilized to read the record shown in FIG. 3.

DESCRIPTION OF THE PREFERRED EMBODIMENTS

In the so-called $sin^2\Psi$ method of X-ray stress measurement, as shown in FIG. 1, an X-ray beam is projected upon the surface EF of a sample along an oblique line PO, and the angle of the maximum diffraction $2\theta\Psi$ of the diffracted rays is measured. Then the value of stress x can be expressed by the following expression;

$$x(Kg/mm^2) = -\frac{1}{2} \cdot \frac{E}{1+\nu} \cdot \cot \theta_0 \cdot \frac{\partial(2\theta\Psi)}{\partial(\sin^2 \Psi)}$$

where
- $E$: Youngs modulus
- $\nu$: Poisson's ratio
- $\theta_0$: Bragg angle (equal to one-half of the diffraction angle) of the sample under no stress condition
- $\Psi$: Angle between a line normal to the sample surface and a bisector of an angle subtended by the incident X-ray beam (PO) and the direction of the maximum diffraction (OQ) or the angle between a normal to the sample surface and a normal to the lattice plane of the crystal of the sample.

Since values of $E$, $\nu$ and $\theta_0$ can be readily determined by experiment or from text book, by putting $$\frac{1}{2} \cdot \frac{E}{1+\nu} \cdot \cot \theta_0 = k$$

where $k$ denotes a constant, we obtain $$x = -k \cdot \frac{\partial(2\theta\Psi)}{\partial(\sin^2 \Psi)}$$

Consequently the value of stress $x$ of the sample can be calculated by knowing values of the maximum diffraction angle $2\theta\Psi$ of diffracted X-rays where the incident angle $\alpha$ of the X-ray beam is varied.

Usually, the spectral distribution of scattered X-rays is measured where incident angle $\alpha$ of the X-ray beam is varied, at an equal angular spacing, for example to 90°, 75°, 60°, 45°, 30°, and the stress $x$ of the sample is calculated from a ratio $$\frac{\partial 2\theta\Psi}{\partial \sin^2 \Psi}.$$

Thus, the spectral distribution of the diffracted rays is recorded in terms of the relation between a time scale representing the diffraction angle and the counts per second (cps) of the diffracted X-rays. As above described, although various methods have been employed to determine the maximum diffraction angle from the record thus obtained, these methods require complicated data processings and calculations to determine the value of stress and are susceptible to errors caused by various parameters.

This invention contemplates to provide a novel method for graphically determining, with X-rays, the stress remaining in materials without relying upon complicated data processings and calculations.

Figure 3:
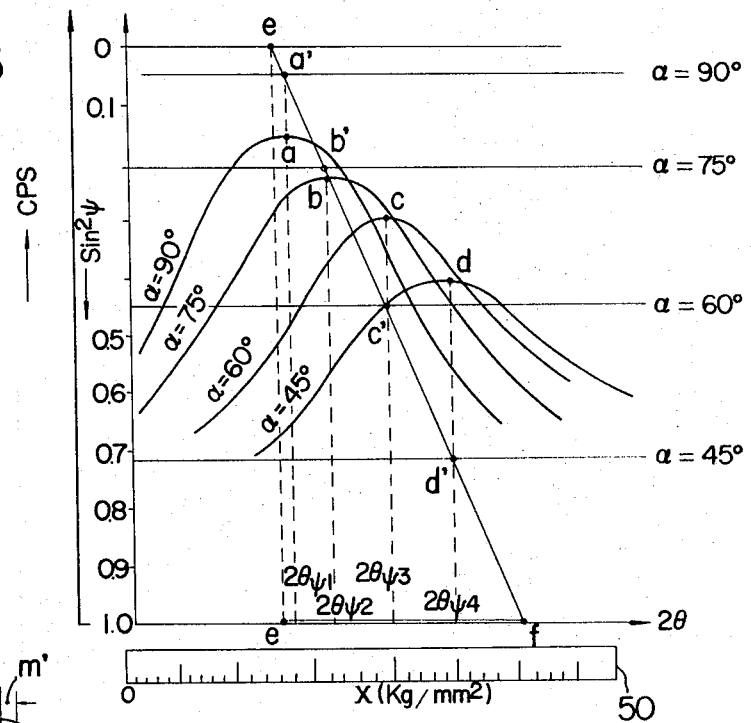
FIG. 3 is a graph illustrating a set of spectral distribution curves recorded by the apparatus shown in FIG. 2.

According to this invention spectral distribution curves of diffracted rays for different incident angles $\alpha$ of an X-ray beam are plotted by a XY recorder on rectangular coordinates, with the abscissa representing diffraction angle $2\theta$ and the ordinate counts per second (cps) and the $\sin^2\Psi$, as shown in FIG. 3; and a special rule as will be described later in detail is used to determine the stress from the plotted curves.

Referring to FIG. 2 an X-ray tube 1 is provided to project an X-ray beam along line PO at an incident angle $\alpha$ with reference to the surface EF of a sample. A projector 2 housing X-ray tube 1 includes a Soller slit schematically indicated as at 3 for producing a beam of parallel X-rays. X-rays diffracted by the sample are received by a receiver 4 which includes a suitable detector 6, such as a Geiger-Müller counter, and a slit indicated by 5 for rectifying the diffracted rays. Receiver 4 is mounted on a sector gear 7 which is driven by a pinion 7a driven by a motor (not shown) which is supported by a casing containing X-ray tube 1 so that the receiver 4 is moved or caused to scan at a constant angular speed around a point of impingement of the X-ray beam 0 to detect the intensity of the diffracted rays in the direction of the diffraction of the X-ray beam. The output voltage from detector 6 is supplied through a counting rate meter 8 to the Y axis of an XY recorder 9 as an electrical signal proportional to the intensity of the diffracted X-rays at an angle in which the detector 6 is directed. As diagrammatically shown, pinion 7a is connected to a transducer 10 which converts the variation in the position of receiver 4 into the variation of a voltage. Since the output voltage from transducer 10 is proportional to the diffraction angle $2\theta$ of X-rays this voltage is applied to the X axis of XY recorder 9.

In this manner, the incident angle $\alpha$ of the X-ray beam with respect to the surface EF of the sample is varied successively to 90°, 75°, 60°, 45°, 30°, with an equal angular spacing (15°, in this example), and the output voltage of transducer 10 at respective angular positions is supplied to the Y axis of XY recorder, while the receiver 4 is moved at the constant angular speed. Further, as the output of transducer 10 is supplied to the X axis of XY recorder 9, there are plotted a series of curves for different incident angles $\alpha$, as shown in FIG. 3.

The ordinate of the rectangular coordinates represents counts per second (cps) and $\sin^2\Psi$. Horizontal lines are also drawn on the graph to cross the ordinate at respective points on the ordinate representing values of $\sin^2\Psi$ under no-stress conditions at predetermined incident angles of 90°, 75°, 60° and 45° respectively. From peak values $a$, $b$, $c$, and $d$ of the plotted spectral distribution curves maximum diffraction angles $2\theta\Psi_1$, $2\theta\Psi_2$, $2\theta\Psi_3$ and $2\theta\Psi_4$, for respective incident angles $\alpha_1=90°$, $\alpha_2=75°$, $\alpha_3=60°$ and $\alpha_4=45°$, can be readily determined. Then, values of $a'=\sin^2\Psi_1$, $b'=\sin^2\Psi_2$, $c'=\sin^2\Psi_3$, and $d'=\sin^2\Psi_4$ can be determined by drawing vertical lines passing through peak points $a$, $b$, $c$, and $d$ in parallel with the ordinate, and by then finding cross points $a'$, $b'$, $c'$ and $d'$ between these vertical lines and horizontal lines representing various values of angle $\alpha$, whereupon these points are interconnected to form a straight line $a'$ $b'$ $c'$ $d'$. A point $e$ on this straight line corresponding to $\sin^2\Psi=0$, and a point $f$ corresponding to $\sin^2\Psi=1$, are projected on the abscissa. The slope of the straight line, or $$\frac{\partial 2\theta\Psi}{\partial \sin^2 \Psi},$$

is measured to represent the stress.

The simplest method of determining the slope of the straight line $a'b'c'd'f$, or for spacing between points $e$ and $f$, is to use a simple scale 50 graduated with $x$ or stress in kg./mm. Thus, when the zero point of the scale is superposed upon point $e$, the graduation of the scale on point $f$ indicates directly the stress sought.

Although the value of stress graphically determined in this manner differs slightly from the correct value obtained by elaborate calculations, such error is comparable with results obtained by measuring error and the result of such measurement is sufficiently accurate for practical purposes.

This invention also provides novel rules for directly determining the value of stress from the distribution curves shown in FIG. 3.

FIG. 4 illustrates one form of such a special rule constructed according to this invention. The rule comprises an A scale in the form of a flat plate marked with an abscissa 11 and ordinate 12 perpendicular with each other, The abscissa is graduated with a tension stress graduation M and a compression stress graduation N which are symmetrically arranged with respect to the ordinate. The ordinate 12 is graduated with $\sin^2\Psi$ in the same manner as in FIG. 3, and a horizontal line corresponding to $\sin^2\Psi=0$ is graduated with a tension stress graduation M' and a compression stress graduation N' which are also symmetrical with respect to the ordinate. A C scale in the form of a lever is pivotally connected to the A scale at a point 13 corresponding to an incident angle of the X-ray beam $\alpha=90°$. A scale is also provided with an elongated horizontal slot 14 crossing the scale of $\sin^2\Psi$ at a point corresponding to $\alpha=45°$. Between scales A and C is interposed a B scale, and a block slidably received in guide slot 14 is connected to the B scale by means of a pin 16 extending through an elongated guide slot 17 perforated through the C scale. Thus, when the B scale is moved in the horizontal direction by being guided by block 15, the C scale is rotated about pivot 13 by the engagement between pin 16 and slot 17.

Scales A, B and C are preferably made of transparent material such as celluloid or plastics.

To use the rule shown in FIG. 4, the graduation corresponding to $\sin^2\Psi=1$, graduated on the A scale (in this embodiment, the abscissa), is aligned with a horizontal line in the graph shown in FIG. 3 and indicating $\sin^2\Psi=1$, while at the same time ordinate 12 of A scale is aligned with a vertical line corresponding to the maximum diffraction angle $2\theta\Psi$, of the spectral distribution curve at an incident angle $\alpha=90°$ of the X-ray beam. Then, B scale is adjusted in the horizontal direction so that the centerline 19 of the C scale comes into alignment with the straight line $a'b'c'd'$ shown in FIG. 3. Values M and M' as determined by crossing points between centerline 19 of C scale and tension stress graduations M and M' are read and the tension stress sought can be calculated as follows.

$$x = m + m' (kg./mm.^2)$$

In the same manner compression stress $x'(Kg./mm.^2)$ can be determined from compression stress graduations N and N'.

Since the value of constant $k$ varies according to the material of the sample and the type of the X-ray tube employed, it is advantageous to provide a number of stress graduations for different values of $k$.

Figure 5:
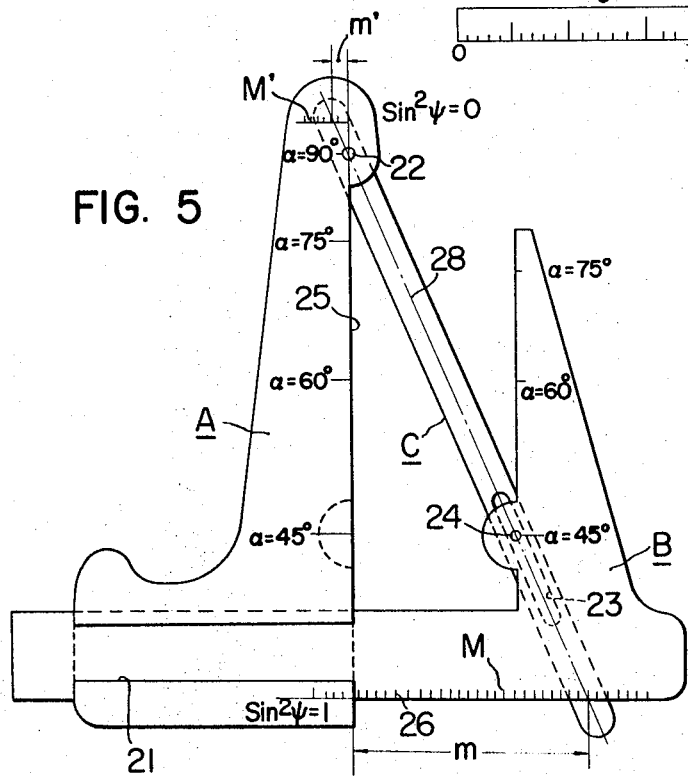
FIG. 5 is a plan view of a modified rule.

FIG. 5 illustrates a modified rule comprising three scales A, B and C of transparent material. In this embodiment, like FIG. 4, the right hand edge 25 which corresponds to the ordinate of rectangular coordinates is graduated with the value of $\sin^2\Psi$ under no-stress conditions at various values of incident angle $\alpha$. At a point corresponding to $\sin^2\Psi=0$, a stress graduation M' is provided. As before, the C scale is pivotally connected to the A scale at a point 22 corresponding to $\alpha=90°$. The B scale is constructed in an L-shaped configuration with its horizontal leg slidably received in a guide groove 21 at the lower portion of the A scale. The lower side edge 26 of the horizontal leg of the B scale, which passes through a point corresponding to $\sin^2\Psi=1$, is provided with a stress graduation M. The B scale is connected to the C scale by means of a pin 24 disposed at a point corresponding to $\alpha=45°$ and extending through an elongated slot 23 of the C scale.

The modified rule shown in FIG. 5 is used in the same manner as that shown in FIG. 4. More particularly, after aligning lower edge 26 of the B scale with the abscissa (FIG. 3) corresponding to $\sin^2\Psi=1$, the right-hand edge 25 of the A scale is aligned with a vertical line in FIG. 3 which corresponds to the maximum diffraction angle $2\theta\Psi$, of the spectral distribution curve at an incident angle $\alpha=90°$. Then the B scale is adjusted in the horizontal direction until the centerline 28 of the C scale comes into alignment with line $a'b'c'd'$ to determine values of $m$ and $m'$. The tension stress $x$ can be expressed by $x = m + m'$ (kg./mm.²) When inverted, the rule shown in FIG. 5 can be used to determine compression stress $x'$ in kg./mm.².

In this manner, according to this invention, as a number of spectral distribution curves of diffracted rays for different incident angle $\alpha$ are plotted on the same recording paper, it is not only easy to note at a glance the difference between respective curves, but also to find abnormal measurement results. Upon recording an abnormal curve, the measurement is tried again to obtain a correct curve. Moreover, with the aid of a special rule, stress can be measured directly from such distribution curves without requiring any complicated data processing. Yet the error of measurements according to this invention is comparable (ordinarily less than few percent) with that of conventional methods relying upon complicated calculations. Thus, the method of this invention is particularly suitable for use in the field or factory, rather than in a laboratory, to measure stress remaining in fabricated structural members or mass produced stocks.

We claim:

1. A method of measuring stress in a material comprising the steps of
   a. projecting an X-ray beam upon the surface of an article under test at a predetermined angle of incidence,
   b. sensing the intensity of a resultant diffracted X-ray beam with means movably disposed with respect to said articles,
   c. generating a first electrical signal, in counts per second, proportional to said sensed intensity with means connected to said sensing means, said first electrical signal representing the intensity of the diffracted X-ray beam and the value of $\sin^2\Psi$, where $\Psi$ represents the angle between a line normal to said surface and a bisector of an angle subtended by said incident X-ray beam and the direction of maximum diffraction,
   d. moving said sensing means in an arc with respect to said article,
   e. generating a second electrical signal proportional to the angle of said sensing means along said arc,
   f. recording said sensed diffraction beam intensities on a display of an electrical XY recording means by applying said first electrical signal to an ordinate input to said recording means, and applying said second electrical signal to an abscissa input to said recording means,
   g. repeating steps a–f at different incidence angles of projection while superimposing said recordings to yield a composite recording,
   h. and determining the peak values of said counts per second for respective curves; calculating values of $\sin^2\Psi$ for respective peak values; drawing a straight line connecting said calculated values of $\sin^2\Psi$; and determining the slope of said straight line with respect to said abscissa, said slope being directly proportional to said stress.

2. A method of measuring stress in a material as set forth in claim 1, in which said step of repeating said steps a–f at different angles of incidence is performed at incidence angles equally spaced by a predetermined angle.

* * * * *